(12) United States Patent
Ichikawa et al.

(10) Patent No.: US 9,180,438 B2
(45) Date of Patent: Nov. 10, 2015

(54) WIRE CATALYST FOR HYDROGENATION/DEHYDROGENATION REACTION AND MANUFACTURING METHOD THEREFOR

(71) Applicants: NIPPON SEISEN CO., LTD., Chuo-ku, Osaka (JP); Masaru Ichikawa, Suginami-ku, Tokyo (JP)

(72) Inventors: Masaru Ichikawa, Tokyo (JP); Yoshinori Tanimoto, Osaka (JP); Tsuneo Akiura, Osaka (JP)

(73) Assignees: NIPPON SEISEN CO., LTD., Osaka (JP); Masaru Ichikawa, Tokyo (JP)

(*) Notice: Subject to any disclaimer, the term of this patent is extended or adjusted under 35 U.S.C. 154(b) by 58 days.

(21) Appl. No.: 14/202,978

(22) Filed: Mar. 10, 2014

(65) Prior Publication Data

US 2014/0194273 A1 Jul. 10, 2014

Related U.S. Application Data

(62) Division of application No. 13/095,522, filed on Apr. 27, 2011, now Pat. No. 8,709,967.

(30) Foreign Application Priority Data

Apr. 28, 2010 (JP) .................. 2010-116733
Feb. 24, 2011 (JP) .................. 2011-038843

(51) Int. Cl.
*B01J 37/12* (2006.01)
*B01J 35/10* (2006.01)
*B01J 23/89* (2006.01)
(Continued)

(52) U.S. Cl.
CPC .............. *B01J 23/8993* (2013.01); *B01J 21/04* (2013.01); *B01J 21/063* (2013.01); *B01J 21/066* (2013.01); *B01J 23/42* (2013.01); *B01J 23/6525* (2013.01); *B01J 23/6527* (2013.01); *B01J 23/6567* (2013.01); *B01J 23/755* (2013.01); *B01J 23/866* (2013.01); *B01J 23/892* (2013.01); *B01J 35/0006* (2013.01); *B01J 35/026* (2013.01); *B01J 35/06* (2013.01); *B01J 37/0215* (2013.01);
(Continued)

(58) Field of Classification Search
None
See application file for complete search history.

(56) References Cited

U.S. PATENT DOCUMENTS 3,919,397 A 11/1975 Gould
4,330,436 A 5/1982 Cairns et al.
(Continued)

FOREIGN PATENT DOCUMENTS

JP 7-192746 A 7/1995

*Primary Examiner* — Melvin C Mayes
*Assistant Examiner* — Colette Nguyen
(74) *Attorney, Agent, or Firm* — Birch Stewart Kolasch & Birch, LLP

(57) ABSTRACT

A wire catalyst for hydrogenation reaction and/or dehydrogenation reaction comprises a metallic core and an oxide surface layer covering at least part of the surface thereof. The metallic core is electrically conductive so that the metallic core itself can generate heat by directly passing an electric current therethrough or electromagnetic induction. The oxide surface layer is made of an oxide of a metallic element constituting the metallic core. The oxide surface layer is provided with a porous structure having pores opening at the surface of the oxide surface layer. The catalytic material is supported in the pores of the oxide surface layer. When a shaped wire catalyst is manufactured, the shaping into a specific shape is made before the oxide surface layer having the porous structure is formed and the catalytic material is supported thereon.

7 Claims, 8 Drawing Sheets

(51) Int. Cl.
*B01J 21/04* (2006.01)
*B01J 21/06* (2006.01)
*B01J 23/42* (2006.01)
*B01J 23/652* (2006.01)
*B01J 23/656* (2006.01)
*B01J 23/755* (2006.01)
*B01J 23/86* (2006.01)
*B01J 35/00* (2006.01)
*B01J 35/02* (2006.01)
*B01J 35/06* (2006.01)
*B01J 37/02* (2006.01)
*B01J 37/34* (2006.01)

(52) U.S. Cl.
CPC ............ *B01J 37/0225* (2013.01); *B01J 37/342* (2013.01); *Y10T 29/49986* (2015.01)

(56) References Cited

U.S. PATENT DOCUMENTS

2002/0077248 A1 6/2002 Nakanishi et al.
2008/0057293 A1 3/2008 Hatanaka et al.

(×160)

(×500)

WIRE CATALYST FOR HYDROGENATION/DEHYDROGENATION REACTION AND MANUFACTURING METHOD THEREFOR

CROSS REFERENCE WITH PCT APP

The present application is a 37 C.F.R. §1.53(b) divisional of, and claims priority to, U.S. application Ser. No. 13/095,522, filed Apr. 27, 2011, now U.S. Pat. No. 8,709,967. Priority is also claimed to Japanese Application No. 2010-116733 filed on Apr. 28, 2010 and Japanese Application NO. 2011-038843 filed on Feb. 24, 2011. The entire contents of each of these applications are hereby incorporated by reference.

BACKGROUND OF THE INVENTION

The present invention relates to a wire catalyst (and shaped wire catalyst) for hydrogenation/dehydrogenation reactions which shows good catalytic activity in a hydrogenation reaction of an aromatic compound and/or a dehydrogenation reaction of a hydrogen derivative of an aromatic compound, and also relates to a method for manufacturing the wire catalyst (and shaped wire catalyst).

In recent years, global warming is seen as a problem, and a fuel cell system attracts attention as a clean energy as an alternative to fossil fuels. Especially, hydrogen attracts attention as a fuel of such fuel cell system.

In the fuel cell system using hydrogen as fuel, discharged during generating electric power is only water, therefore, such system attracts attention as an energy source whose environmental load is smallest, in other words, which is most environmentally friendly and clean.

On the other hand, in the case of engines of gasoline automobiles, diesel generators for ships/locomotives, etc., by employing "hydrogen-oil co-combustion technique" in which hydrogen is added to the fuel oil, it is possible to improve fuel consumption and reduce the generation of substances becoming environment loads, e.g. $CO_2$, NOx, CO and the like.

Meanwhile, hydrogen is gaseous body at ordinary temperatures and a combustible and explosive substance. Therefore, hydrogen has problems with its storage and transportation.

Currently, therefore, studies are being made on a hydrogen storage-supply system capable of storing hydrogen safely and capable of supplying hydrogen quickly responding to the demand.

At present, the following methods have been proposed as methods for supplying hydrogen:

A) a method in which hydrogen is stored in a cylinder or tank and delivered to end users, B) a method in which hydrogen is prepared from city gas or propane gas established as infrastructures by means of a steam reforming technique or the like, C) a method in which hydrogen is made by electrolysis of $H_2O$ utilizing surplus nighttime electric power, D) a method in which hydrogen is made by electrolysis of $H_2O$ utilizing electric power produced by wind power, solar energy and the like, E) a method in which hydrogen is made by utilizing photosynthesis bacteria, anerobic hydrogen bacteria and the like.

Among these methods, the method (A) is readily feasible as a hydrogen supply system, but it is supposed that this system is gradually restricted in view of safety issues because hydrogen is combustible gas.

In the case of the method (B), on the other hand, it is possible to utilize the existing gas pipings. From this viewpoint, this method is feasible, but the reforming devices are usually not good at the productivity rate of hydrogen and the hydrogen supplying response.

Further, there is a problem such that purification/elimination of poisonous constituents such as CO produced as by-products increases the processing cost.

In the case of the methods (C)-(E), a time-lag is liable to occur between demand of hydrogen and the supply, therefore, there is a problem such that the supply of hydrogen is hard to follow the load changes caused by electrical demand changes.

In order to bring about the realization of the methods B-E which have potential of practical applications, studies are made on efficient hydrogen storage/supplying system which can store the produced hydrogen and can supply the stored hydrogen to a fuel-cell-system, internal-combustion engine or the like in good response to the need.

To give actual examples of such system, in Japanese patent application publication Nos. JP-7-192746 and JP-5-270801, a system utilizing a hydrogen storage alloy, and a system utilizing a carbon material such as carbon nanotube, carbon nanofiber or the like have been disclosed.

Further, in Japanese patent application publication No. JP-4-354544, there has been disclosed a catalyst structure which is supported on the surface of a metal which is material shaped in the form of a wire, filament, fine tube, mesh or fabric, and this shaped metal material is provided with a surface layer which is made of aluminum oxide or comprises aluminum oxide as its major component. And it is also disclosed that platinum, palladium and ruthenium can be used as the catalyst.

By employing a hydrogen storage alloy, it is possible to construct such a system that the storage and extraction of hydrogen can be easily controlled by the temperature.

But, the amount of storage of hydrogen per unit weight of the alloy is small. For example, in the case of a typical hydrogen storage alloy LaNi, the amount of hydrogen storage is about 3 wt % at best.

Further, the rate of storage or extraction of hydrogen is low, therefore, there is a problem with the response. Furthermore, due to the hydrogen storage alloy itself, the system has disadvantages such that the weight and cost of the system are inevitably increased.

In the case of the system utilizing the carbon material, on the other hand, materials having high hydrogen storage amount are now being developed, but the hydrogen storage amount is not yet sufficient.

In addition, these materials are difficult to synthesize industrially on a large scale, therefore, due to the cost and quality of the obtained carbon materials, this system has not yet reached to a practical level.

In the above-mentioned Japanese patent application publication No. JP-4-354544, the disclosed object is merely to increase the catalytic reaction (or the amount of the catalyst per unit volume). There is no disclosure about how to improve the response of the catalytic reaction.

SUMMARY OF THE INVENTION

With the view of the above problems, the present invention was studied out.

Therefore, an object of the present invention is to provide a wire catalyst/shaped wire catalyst usable in a hydrogen storing/supplying system as the catalyst capable of storing and/or supplying hydrogen in good response; and a method for manufacturing the wire catalyst/shaped wire catalyst.

Another object of the present invention is to provide the above-mentioned wire catalyst/shaped wire catalyst in which the formability into a various shape is improved, and limitations of environment of usage are lessened or eliminated by forming as a self-heating type, and thereby it is possible to simplify the apparatus in the system and also simplify the manufacturing.

According to one aspect of the present invention, a wire catalyst is designed for hydrogenation reaction and/or dehydrogenation reaction, and the wire catalyst comprises a main wire and a catalytic material supported thereon, wherein the main wire comprises a metallic core and an oxide surface layer covering at least part of the surface thereof, the metallic core is electrically conductive so that the metallic core itself can generate heat by directly passing an electric current therethrough or electromagnetic induction, and the oxide surface layer is made of an oxide of a metallic element constituting the metallic core, and the oxide surface layer is provided with a porous structure having pores opening at the surface of the oxide surface layer, and the catalytic material is supported in the pores of the oxide surface layer.

Therefore, the wire catalyst can be increased in the amount of the supported catalytic material per unit volume by the increased surface area.

Since the wire catalyst has the catalytic material supported within the porous structure, the separation of the catalytic material during use can be effectively prevented for the long term.

As a result, the handling of the wire catalyst 1 is easy, and the shape can be changed depending on the intended use. Further, since the metallic core itself can generate heat, the temperature can be controlled easily by changing the electrical current passing therethrough, and as a result, it becomes possible to improve the reaction response.

Preferably, the wire catalyst is provided with connecting portions for electric wiring. For that purpose, the main wire can be provided at at least two positions in the axial direction thereof with portions where the insulative oxide surface layer is not formed and the conductive surface of the metallic core is exposed.

Preferably, an equivalent wire diameter (d) of the main wire is set to be not more than 1 mm, and in a cross section of the main wire, the perimeter of the main wire is not less than 3.0 times a maximum diameter of the main wire, wherein the maximum diameter is defined by the distance between two parallel straight lines contacting with the periphery of the main wire the distance between which becomes maximum.

Preferably, the catalytic material includes at least one of platinum, rhodium, rhenium, nickel, titanium, magnesium, zinc, zirconium, molybdenum and tungsten.

Preferably, the metallic core is formed from a composite wire comprising a metallic central core portion a metallic outer coat portion covering the surface thereof, wherein the metallic central core portion is made of at least one kind of metal selected from the group consisting of copper, magnesium, calcium, nickel, cobalt, vanadium, niobium, chrome, titanium, aluminum, silicon, molybdenum, tungsten and iron, or which is made of an alloy including at least one kind of metal selected from the group, and the metallic central core portion has an electrical resistivity of not less than 5 micro ohm/cm at ordinary temperatures, and the metallic outer coat portion is made of a metallic material different from that of the metallic central core portion.

Preferably, the porous structure is a mesoporous porous structure having bottomed microscopic pores having a depth and a pore diameter, wherein the pore diameter is not more than 100 nm, and the depth is 50 to 2000 times the pore diameter.

According to another aspect of the present invention, at least part of the wire catalyst is shaped into the form of a coil.

Therefore, due to the coil-shaped part, the amount of the supported catalytic material can be further increased, and the contact between the catalytic material and the fluid to be processed is increased, therefore, the efficiency and response of the reaction can be improved.

Preferably, the coil-shaped part has an average coil diameter (D) of from 3 to 20 times the equivalent wire diameter (d).

With respect to the wire catalyst supported in the coil-shaped part, preferably, the apparent surface area (sq.mm) of the wire catalyst per unit volume (cu.mm) of a space surrounded by the coil-shaped part is set in a range of from 0.5 to 6 sq.mm/cu.mm.

According to still another aspect of the present invention, a method for manufacturing the shaped wire catalyst comprises the steps of:

preparing a metallic core in the form of a wire;

shaping the metallic core into a predetermined specific shape; then applying a surface treatment to the shaped metallic core so that, through an oxidizing reaction, the shaped metallic core is at least partially provided with an oxide surface layer having a porous structure having a large number of microscopic pores; and providing a catalytic material supported in the microscopic pores.

Therefore, defects in the oxide surface layer such as cracks and chipping-off can be effectively prevented because the shaping into the specific shape is made first and then the oxide surface layer is formed and the catalyst is supported thereon. Thus, it is possible to shape the wire catalyst into various shapes without causing defects in the oxide surface layer, and the method is suited to mass production.

It is possible that the method further comprises a step of drawing the metallic core to decrease the diameter so that the total surface reduction rate becomes not less than 80%, wherein the metallic core is a composite wire comprising a metallic central core portion having an electrical resistivity of not less than 5 micro ohm/cm at ordinary temperatures, and an aluminum layer covering the surface of the metallic central core portion. And in the step of shaping the metallic core, the composite wire of which diameter is decreased is coiled.

Further it is possible that the method further comprises a step of applying, after forming the oxide surface layer having the microscopic pores, a pore enlarging treatment to increase the opening area and depth of the pores and/or a calcination treatment.

Further, the step of providing the supported catalytic material can include a treatment for making the catalytic material being supported in the pores of the oxide surface layer by impregnation or vapor-phase deposition, and a treatment for calcining and/or reducing the metallic core with the supported catalytic material.

According to still another aspect of the present invention, a combustion system for an internal-combustion engine comprises a means for producing hydrogen including the wire catalyst, and a means for mixing the hydrogen produced by the catalytic activity and a main fuel and supplying the mixture to the internal-combustion engine.

DESCRIPTION OF THE PREFERRED EMBODIMENTS

Figure 1:
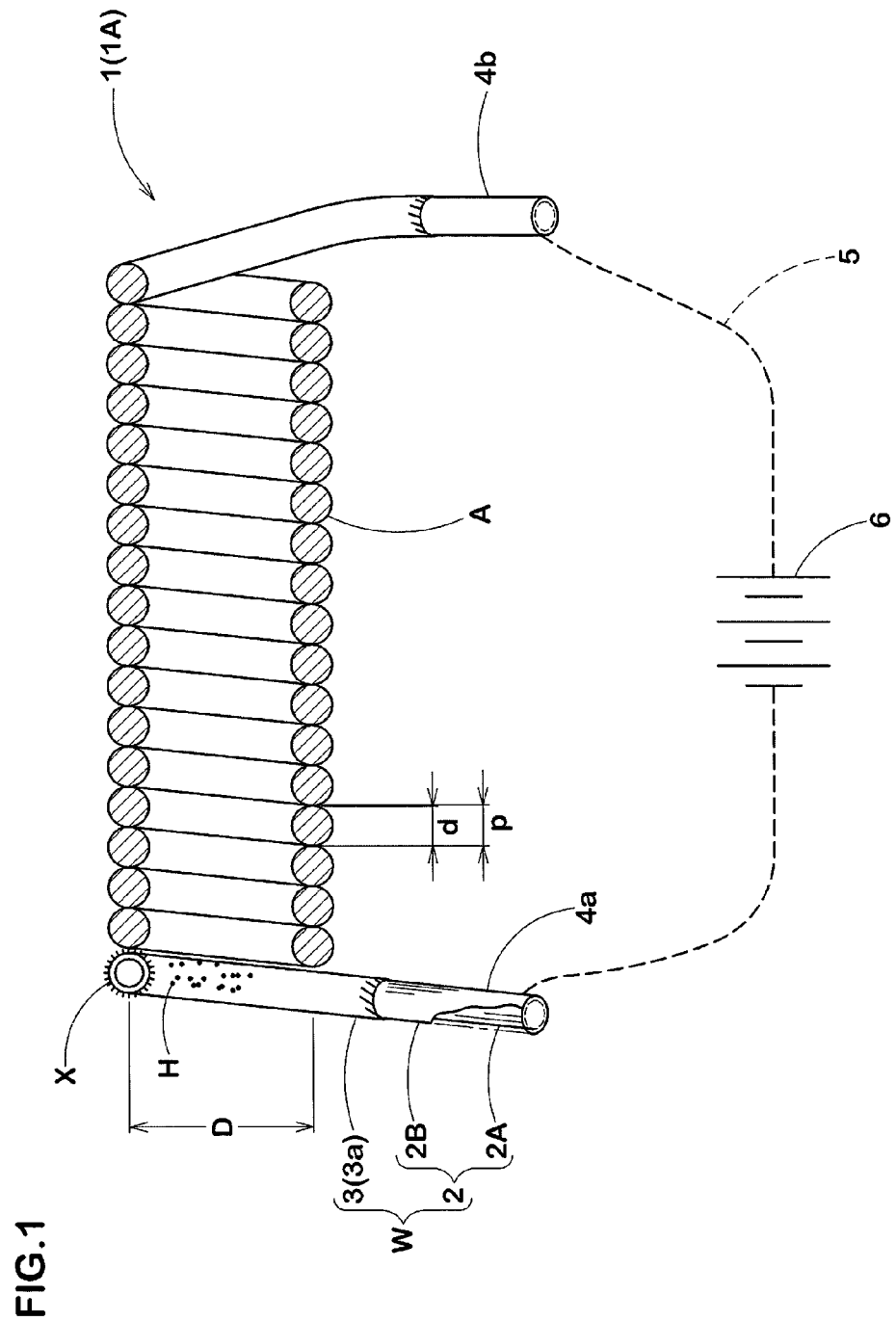
FIG. 1 is a cross sectional view of a coil-shaped wire catalyst according to the present invention.

Embodiments of the present invention will now be described in detail in conjunction with accompanying drawings.

According to the present invention, the wire catalyst is designed for use as a catalyst for hydrogenation reaction of an aromatic compound and/or dehydrogenation reaction of an hydrogenated aromatic compound.

The wire catalyst 1 comprises a main wire W and a catalytic material X supported thereon.

The main wire W comprises a metallic core 2 in the form of a continuous wire, and an oxide surface layer 3 formed as the surface layer covering the metallic core 2.

The oxide surface layer 3 has a porous structure having microscopic pores opening at the surface of the oxide surface layer 3. For example, the oxide surface layer 3 is an alumina layer 3a.

The catalytic material X can be supported on the surface of the oxide surface layer 3 and the inner surfaces of the pores.

Therefore, the amount of catalytic material X supportable per unit volume is increased, and the response in the catalytic reaction can be improved.

Further, with respect to the catalytic material X supported in the porous structure, separation of the catalytic material during use can be effectively prevented for the long term.

As a result, the handling of the wire catalyst 1 is easy, and the shape can be changed depending on the intended use.

Furthermore, as the metallic core 2 is electrically conductive, the wire catalyst 1 can be self-heated by passing an electric current directly therethrough or utilizing electromagnetic induction.

In order to facilitate the electric wiring, the wire catalyst 1 can be provided with at least two connecting portions or ports 4a and 4b partially in its length direction.

In each of the connecting portions, the oxide surface layer 3 (for example undermentioned alumina layer 3a) is omitted so that the surface of the metallic core 2 is substantially exposed.

In the example shown in FIG. 1, the connecting portions 4a and 4b are formed at both ends of the (coil-shaped) wire catalyst 1.

By connecting an external power supply 6 to the connecting portions 4a and 4b through wirings 5, and passing an electric current directly through the metallic core 2, the wire catalyst 1 can be heated up to the desired temperature.

Therefore, in the case that a plurality of the wire catalysts 1 are used, it is possible to control the temperature of the respective wire catalysts 1 independently from each other. Thus, it becomes possible to improve the response in the catalytic reaction.

Needless to add, it is also possible to heat the metallic core 2 by electromagnetic induction utilizing the electrical energy supplied by the external power supply 6. Incidentally, when utilizing the electromagnetic induction, the wire catalyst 1 is electronically looped so that the induced electric current can flow.

The wire catalyst 1 can be used without shaping into a specific shape, namely, as it is formed as a long wire material.

But, preferably and usually, the wire catalyst 1 is shaped and used as a shaped wire catalyst 1A.

FIG. 1 shows an example of the shaped wire catalyst 1A which is shaped into the form of a coil having a predetermined coil diameter D and coil pitches P.

Not shown, but it is also possible to shape the wire catalyst or wire catalysts 1 into various shapes: a screen mesh (by weaving a plurality of wire catalysts as warp and weft); a felt-like sheet, cotton-ball-like mass, woven fabric, knit and the like by the use of very file fibrous wire catalyst(s); and the like.

The above-mentioned main wire W or metallic core 2 in this embodiment has a circular cross-section.

But, any noncircular cross-sectional shape, for example, oval shape, triangular shape, flat shape, rectangular shape, star-like shape and the like may be employed. By employing such cross-sectional shape, the surface area is increased, and the amount of catalytic material supportable per unit volume is increased.

Especially, measured in a cross section of the metallic core 2 at any position therealong, the perimeter of the metallic core 2 is preferably set in a range of not less than 3.0 times, more preferably 3.1 times, but not more than 10 times the maximum diameter of the metallic core 2.

Here, the maximum diameter is defined by the distance between two parallel straight lines contacting with the periphery of the metallic core 2 the distance between which becomes maximum.

Thereby, mechanical characteristics as of a shaped wire catalyst may be improved.

The equivalent wire diameter d of the main wire W (which is substantially same as that of the metallic core 2 if the oxide surface layer is very thin or not more than about 30 micrometers) is set to be not more than 1 mm, preferably not more than 0.8 mm, more preferably not more than 0.7 mm, but not less than 0.01 mm.

Here, the equivalent wire diameter means the diameter of a circle whose area is equal to the cross-sectional area of the wire concerned.

Thereby, it becomes possible to increase the surface area per unit volume, and the shaping becomes easy.

The metallic core 2 can be composed of one kind of metallic material or plural kinds of metallic materials. In this embodiment, the metallic core 2 is composed of two kinds of metallic materials which respectively form: a metallic central core portion 2A, and a metallic outer coat portion 2B covering the metallic central core portion 2A (hereinafter referred to as "jacket" in short).

Considering the electrical characteristic enabling the self-heating of the wire catalyst 1, it is especially preferable that the metallic central core portion 2A is made from at least one element selected from the following group consisting of copper, magnesium, calcium, nickel, cobalt, vanadium, niobium, chrome, titanium, aluminum, silicon, molybdenum, tungsten and iron, or an alloy containing at least one element selected from the above group.

As to the chemical composition of the metallic central core portion 2A, for example JIS NCH1 and NCH2 comprising 15 to 25 wt % of Cr, not less than 55 wt % of Ni+Co, not more than 0.15 wt % of C, 0.5 to 1.5 wt % of Si, not more than 2.5 wt % of Mn, the balance being Fe and very slight incidental impurities; and JIS FCH1 and FCH2 comprising 15 to 25 wt % of Cr, not more than 0.10 wt % of C, not more than 1.5 wt % of Si, not more than 1.0 wt % of Mn, 2 to 6 wt % of Al the balance being Fe and very slight incidental impurities can be preferably used.

As to the above-mentioned nickelic material, for example N200 material (UNS-N02200) comprising not less than 99 wt % of Ni is preferably used when aluminum is used as the jacket 2B because both have similar heat generation characteristics and wire drawing characteristics, thus effective wire thinning (drawing) is possible.

Among the above-mentioned metallic materials, it is especially desirable for the metallic core 2 to use a metallic material whose electrical resistivity is not less than 5 micro ohm/cm but not more than 200 micro ohm/cm at ordinary temperature of 25 degrees c.

Therefore, the wire catalyst 1 can be easily heated up to specific operating temperatures for example 200 to 600 degrees C. by passing an electric current (1) directly through the metallic core 2 or (2) utilizing electromagnetic induction, at the point of use.

Thus, it becomes possible to improve the response in the hydrogenation reaction or dehydrogenation reaction.

Further, with respect to the environment of usage and the state of usage, limitations are almost eliminated which helps to increase the application range.

It is preferred that the metallic core 2 is made from a low-expansion material such that the coefficient of thermal expansion of the metallic core 2 from 0 to 100 degrees C. is not more than $20 \times 10^{-6}$/degrees C. Thereby, the occurrence of damage of the oxide surface layer 3 due to the expansion and contraction of the metallic core 2 can be reduced.

Figure 2:
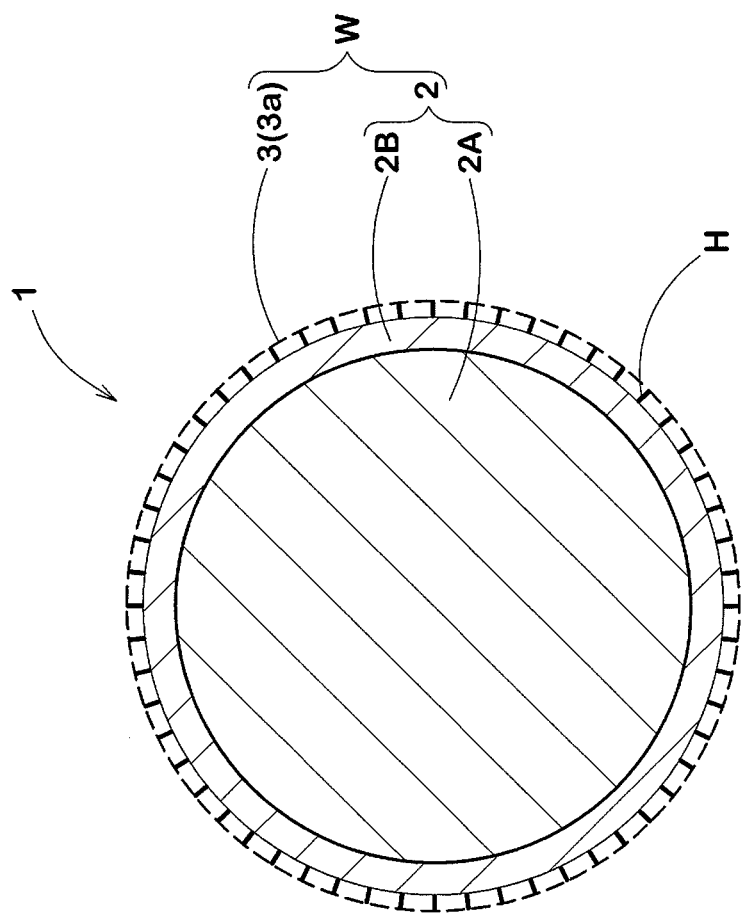
FIG. 2 is an enlarged cross sectional view of a wire catalyst according to the present invention.

In the embodiment shown in FIGS. 1 and 2, the metallic core 2 is composed of the above-mentioned metallic central core portion 2A made of an alloy comprising nickel and/or chrome for example and becoming the core which self-heats up by the direct passing of an electric current or electromagnetic induction, and the above-mentioned metallic outer coat portion 2B made of aluminum which annularly completely covers the periphery of the metallic central core portion 2A and forms the alumina layer 3a as the oxide surface layer 3.

Figure 3:
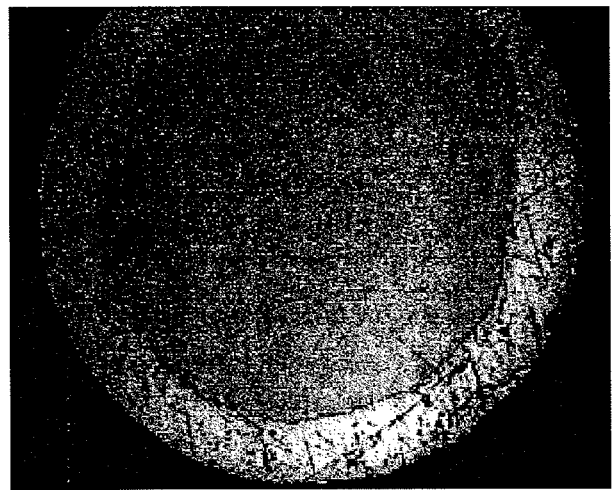
FIG. 3 is a microscope photograph (×160) showing a cross section of a metallic core.

As shown in FIG. 3, the metallic outer coat portion 2B is united with the metallic central core portion 2A.

As shown in FIGS. 2-6 for example, through an oxidation surface treatment (alumite treatment), the metallic outer coat portion 2B made of aluminum covering the metallic core 2 forms, at the outermost side thereof, an alumina surface layer 3a while leaving an aluminum layer on the inside thereof.

The alumina surface layer 3a has a porous structure with microscopic pores H opening at the surface.

As to the metallic material of the jacket 2B, aside from aluminum, for example, Ta, Mg, Ti and the like can be used. In such a case, accordingly, an oxide surface layer of such element is used instead of the alumina layer.

As explained, the main wire W is formed from the metallic core 2.

Figure 4:
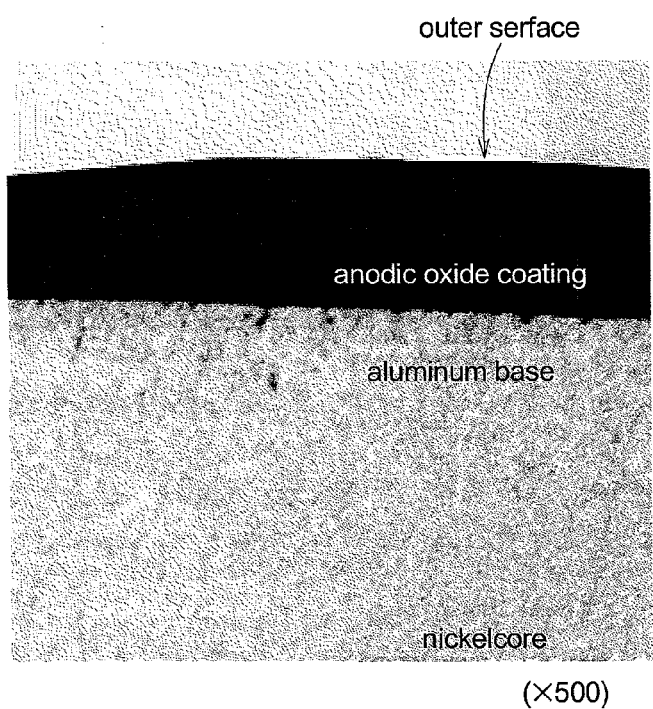
FIG. 4 is a microscope photograph (×500) showing a cross section of the wire catalyst provided with an oxide surface layer (alumina layer).

FIG. 4 is a microscope photograph showing a surface part of the main wire W provided with the outermost alumina surface layer 3a.

In the case that the metallic core 2 is thin as in this embodiment, it is desirable that the metallic central core portion 2A which is still in a thick state is cladded with the metallic outer coat portion 2B and then subjected to wire drawing to reduce to a target diameter.

In this case, the total surface reduction rate is preferably not less than 80%, for example, in a range of from 90 to 99.95% (namely it is high deformation processing). Thereby, the adhesion of the clad can be improved.

Incidentally, the surface reduction rate may be changed according to the kind, characteristics and the like of the material.

In order for the wire drawing of such composite metallic core 2, if necessary, it is possible to provide an additional coat made of a soft metallic material (which may be finally removed), wherein before making this additional coating process, it is possible to make a heat treatment process in which the processed material is subjected to a temperature which is relatively low such that the metals in the core wire 2A and jacket 2B do not diffuse from one to the other.

Aside from the above-explained clad technique, it is also possible to coat the metallic central core portion 2A with the metallic outer coat portion 2B by means of a metallizing plating technique for example.

Further, as another technique to form the metallic outer coat portion 2B for forming the alumina surface layer, it is possible to utilize the precipitation, more specifically, to make the metallic core 2 from a metallic material comprising aluminum and then form an aluminum surface layer on the metallic core 2 as a precipitate layer of aluminum through a precipitation heat treatment.

In the main wire W composed of the metallic central core portion 2A and the metallic outer coat portion 2B, the composition rate of coating is preferably set in the range of from 2 to 40%, more preferably 5 to 30%, still more preferably 8 to 25%.

Here, the composition rate of coating is the rate of the entire volume of the metallic outer coat portion 2B inclusive of the alumina surface layer 3a to the entire volume of the main wire W.

Form various test results, it was found that if the above-mentioned rate is less than 2%, it becomes difficult to obtain the alumina surface layer 3a having a sufficient thickness. If more than 40%, the production efficiency is decreased, and there is a possibility that failures are caused by the impact of heat during use and the strength is decreased.

The thickness of the metallic outer coat portion 2B is preferably not more than 0.5 mm, more preferably set in a range of from 10 to 100 micrometers.

In the formation of the alumina surface layer 3a, it is preferable to carry out a surface treatment which includes an anodizing treatment in which the metallic outer coat portion 2B is anodized, and
a heat calcination treatment in which the coat portion is heated up to about 350 to 600 degrees c.

Usually, the anodizing treatment is achieved by making an electrochemical treatment in a specific electrolysis solution, for example, as disclosed in Japanese patent application publication Nos. 2-144154 and 8-246190.

In the case of the metallic core 2 in which the metallic central core portion 2A is clad in the metallic outer coat portion 2B made from aluminum as shown in FIGS. 1 and 2, by anodizing the surface of aluminum with a treatment liquid using sulphuric acid or oxalic acid, it is possible to form the alumina surface layer 3a of a porous structure having a pore diameter of 1 to 200 nanometers and a thickness of 0.1 to 500 micrometers, preferably not more than 100 micrometers, more preferably 5 to 60 micrometers.

Such porous structure is supposed to be formed such that colloid of alumite agglutinates into grains, and the grains grow while forming void in the surface where there in no grain, thus pours are formed by the void.

The alumina surface layer 3a is formed over the entire surface of the metallic core 2 excluding the above-mentioned connecting portions 4a and 4b.

In order to form the alumina surface layer 3a partially, the following methods can be employed:
a method such that only the part where the alumina surface layer 3a is required is dipped into the treatment liquid;
a method such that the entirety is dipped into the treatment liquid after the part where the alumina surface layer 3a is not wanted is covered with a masking material removable afterward.

Figure 5:
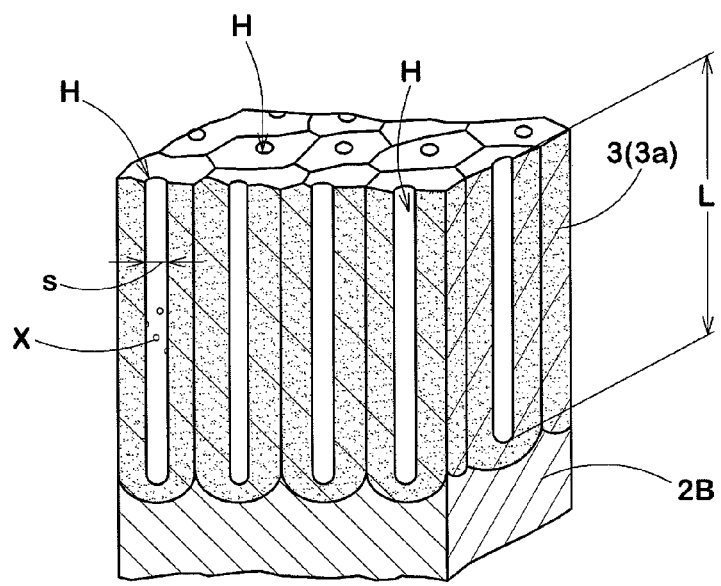
FIG. 5 shows a porous structure of the oxide surface layer (alumina layer or alumite layer) on which the catalyst is supported.

FIG. 5 shows an example of the porous structure.

Figure 6:
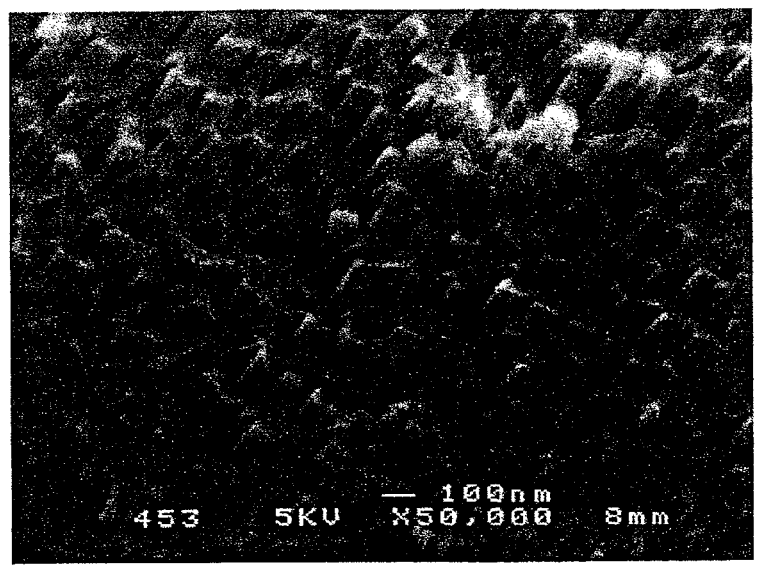
FIG. 6 is a microscope photograph showing the surface of a porous structure according to the present invention.

FIG. 6 is a microscope photograph showing the porous structure.

This porous structure is a mesoporous structure in which a number of microscopic pores H are arranged in a honeycomb pattern.

The microscopic pore H has a pore diameter s of not more than 100 nanometers, preferably 30 to 80 nanometers.

The microscopic pore H has a bottom at a depth L from the surface.

The aspect ratio of the depth L to the pore diameter s is preferably set in a range of from about 50 to about 2000, more preferably 80 to 1000.

If needed, the aspect ratio of the microscopic pore H can be adjusted by the undermentioned pore enlarging treatment or the post-treatment of the heat calcination treatment.

Since the cross-sectional shapes of the pores H are not always circular, the pore diameter s means the equivalent diameter which is the diameter of a circle whose area is equal to the opening area of the pore.

The alumina surface layer 3a is electrically nonconductive, therefore, the wire catalyst 1 covered with such insulating coating can be used without taking particular measures against electrical short due to contact with other members such as housing and support.

The porous structure of the alumina surface layer 3a is very fine and hard, therefore, the deformation of the microscopic pores H and closure of the pores due to the deformation can be prevented. Accordingly, the catalytic material X supported on the inner surface of the microscopic pores H can work surely.

After the anodizing treatment, it is possible to adjust or increase the opening area and/or depth of the pore through a pore enlarging treatment such that the metallic central core portion 2A is dipped into a treatment liquid for a specific amount of time, wherein the treatment liquid is of the same kind as the above-mentioned treatment liquid of nitric acid, sulphuric acid or oxalic acid OR {sulphuric acid or oxalic acid} having dissolving power with respect to the alumina surface layer 3a.

Further, it is possible to make the above-mentioned heat calcination treatment after the metallic core 2 is subjected to a hydration treatment using sodium hydroxide, ethyl amine, ethylene diamine or the like for a specific amount of time.

Thus, the main wire W (alumite clad metallic core) having the heat-resisting porous alumina surface layer 3a having for example a thickness of about 1 to 100 micrometers and a pore diameter of about 10 to 100 nanometers can be made.

As shown in FIG. 5 for example, the catalytic material X is fixedly supported on the inside wall surface of the microscopic pores H of the porous structure of the oxide (alumina) surface layer 3 with a specific density of distribution.

According to the intended use, the catalytic material X can be selected from various materials. For example, platinum (inclusive of platinum group of metals and their alloys) is preferred.

Also at least one transition metal selected from the group consisting of rhodium, rhenium, nickel, titanium, magnesium, zinc, zirconium, molybdenum and tungsten may be preferably used.

The catalytic material X is supported on the main wire W through such a support method that
the solution of the above-mentioned metal, e.g. platinum solution is applied to the porous structure of the oxide (alumite) layer, and then
the porous structure is pressurized so that the pores H are impregnated with the solution.

As to the platinum solution, for example, hydrogen hexachloroplatinate(IV) hexahydrate liquid, diammine dinitro platinum(II) nitric acid solution, hexammine platinum (IV) chloride solution, tetraammineplatinum (II) hydroxide solution or the like can be used suitably in this method.

The catalytic material X can be supported at a time or gradually through a technique of trickling, applying or spraying the solution of salt of platinum and/or the above-mentioned transition metal or dipping into the solution
during heating the main wire W up to a specific temperature range by passing an electric current therethrough or by means of electromagnetic induction.

Further, the catalytic material X can be supported through a chemical vapor fixation technique (chemical vapor Deposition) using a metal carbonyl compound {e.g. $Pt(CO)_2Cl$, $Rh_4(CO)_{12}$, $Ni(CO)_4$, $Re_2(CO)_7$ or the like}, $CpTiCl_2$ (Cp=cyclopentadienyl), $Mo(CO)_6$ or the like.

After the catalytic material X is supported, if necessary, it is possible to make an activation treatment by gradually calcining it within a temperature range of from 250 to 600 degrees C. in the atmosphere including oxygen, and then gradually increasing the temperature within a temperature range of from 100 to 450 degrees C. in hydrogen gas atmosphere.

It is possible to adjust the wire catalyst 1 which supports the platinum and/or transition metal by applying to the hydrogen activation treatment or a reduction treatment using a reducing agent such as hydrazine and boron hydride, or the like.

The amount of the supported catalytic material X is for example, 0.01 to 10% by weight, preferably 0.1 to 5% by weight with respect to the main wire W.

In the atom ratio, the amount of the supported platinum and transition metal is 0.1 to 10, preferably 0.1 to 0.5.

The catalyst precursor substances, and methods for manufacturing the catalyst and conditions for the activation treatment are described as above, but the present invention is not limited thereto.

The wire catalyst 1 constructed as above can improve the response rate of hydrogenation reaction for aromatic hydrocarbon and/or that of dehydrogenation reaction for a hydrogenated derivative of the aromatic compound because the main wire W provided with the alumina surface layer 3a of the pore structure is increased in the specific surface area and the catalytic material X can be effectively and stably maintained thereon.

Accordingly, as the catalyst for hydrogenation reaction and/or dehydrogenation reaction, the wire catalyst 1 according to the present invention becomes high efficiency and superior to the response performance.

Further, the pores can prevent structural abnormality such as lack of the catalytic material X, and the stability over a long period of time, of the catalytic activity such as the hydrogenation/dehydrogenation reaction rate and the response performance can be improved.

As shown in FIG. 1, the wire catalyst 1 is preferably formed as a coil-shaped wire catalyst 1A having a coiled part, wherein the coiled part has an average coiling diameter D of from 3 to 30 mm for example.

Especially preferably, the both end portions thereof (not coiled in this embodiment) are formed as the connecting portions 4a and 4b where the oxide surface layer 3 is omitted and the metallic core 2 is exposed.

The above-mentioned alumina surface layer 3a as the oxide surface layer 3 is very hard and brittle.

If the coiling diameter is too small, the surface layer of the wire catalyst 1 is subjected to large deformation or distortion. Accordingly, if the shaping into a specific shape such as coil is made after the alumina surface layer 3a is formed, the alumina surface layer 3a is liable to be broken.

On the other hand, the metallic core 2 is repeatedly subjected to expansion and contraction due to the heating and cooling during use of the wire catalyst 1. Accordingly, the alumina surface layer 3a is liable to be broken or separated.

Therefore, it is important to design the shaped wire catalyst 1A in consideration of these facts.

In concrete terms, it is preferred that the shaping into the desired shape such as coil is done in advance of the formation of the alumina surface layer 3a.

In the case of the coil-shaped wire catalyst 1A, it is preferable that the average coiling diameter D is set in a range of not less than 3 times, more preferably 3 to 20 times, still more preferably 5 to 15 times, most preferably 7 to 10 times the equivalent diameter d of the wire catalyst 1.

If the diameter ratio o/d is less than 3, cracks are liable to occur on the alumina surface layer 3a due to the expansion and contraction caused by heating and cooling in use.

If the ratio is too large, on the other hand, the amount of the supported catalytic material decreases.

The coil-shaped wire catalyst 1A provided with the above-mentioned ratio D/d shows a functional elasticity similar to usual coil springs, which is of advantage when it is built in a casing.

The coil pitches P of the coil-shaped wire catalyst 1A is set to be not more than 2 times, preferably not more than 1.50 times, but preferably not less than 1.01 times the equivalent diameter d of the wire catalyst 1.

Usually, it is preferred that the coil-shaped wire catalyst is formed to have a relatively short length of not more than 30 cm, for example, not more than 20 cm but not less than 0.5 cm so that a plurality of wire catalysts 1 can be disposed in a vessel as explained later.

Further, by adjusting the coil shape, it is possible to increase the amount of supportable catalytic material while securing the flow path for the supplied fluid to be processed.

Furthermore, as the thermal efficiency of the wire catalyst 1 is increased, it becomes possible to improve the performance.

Still furthermore, it is possible to avoid entanglement of the wire catalyst 1 with another member (for example, vessel) such that the another member enters between the turns of the coil.

In the coiled part, it is preferable that, by the above-mentioned adjustments, the apparent surface area of the wire catalyst 1 (calculated from the equivalent wire diameter) per unit volume of the space enclosed with the coiled part (volume of the coiled part regarded as a cylindrical body) is increased to 0.5 to 6 sq.mm/cu.mm, preferably 1.0 to 3.0 sq.mm/cu.mm, more preferably 1.3 to 2.8 sq.mm/cu.mm.

If the apparent surface area is less than 0.5 sq.mm/cu.mm, the elasticity as of the coil-shaped wire catalyst becomes inferior, and further it becomes hard to obtain the sufficient amount of the supported catalyst material.

If more than 6 sq.mm/cu.mm, since the above-mentioned ratio D/d decreases, it becomes difficult to obtain the defect-free alumina surface layer 3a without surface crack.

Figure 8:
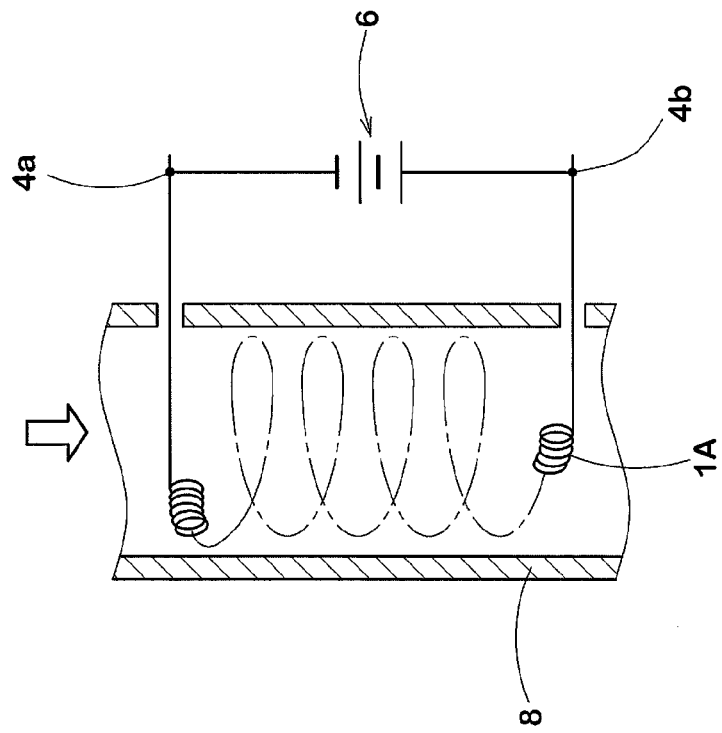
FIG. 8 is a cross sectional view for explaining another example of the coil-shaped wire catalyst and a state of usage.
Figure 7:
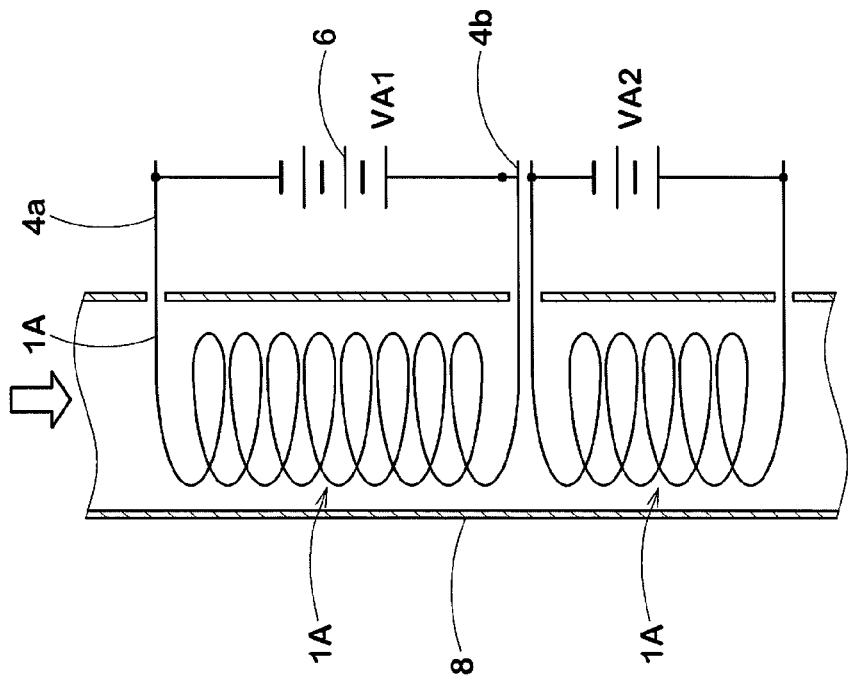
FIG. 7 is a cross sectional view for explaining an example of the usage of the coil-shaped wire catalysts.

The coil-shaped wire catalyst 1A is, as shown in FIG. 7 and FIG. 8 for example, built in a vessel 8 or piping for the fluid to be processed (namely, to be hydrogenated or dehydrogenated). In these figures, the allows indicate the flow direction of the fluid to be processed.

By connecting the above-mentioned connecting portions 4a and 4b to the external power supply 6, an electric current supplied therefrom passes through the wire catalyst 1, and thereby the wire catalyst 1 is self-heated. As a result, more effective hydrogenation reaction is possible.

In the embodiment shown in FIG. 7, the coil-shaped wire catalyst 1A is disposed in a vessel (piping) 8 such that the axis of the coiled part around which the wire catalyst 1 is wound, extends along the axis of the vessel 8 (in this example extends substantially straight).

In the embodiment shown in FIG. 8, the coil-shaped wire catalyst 1A is double coiled such that the wire catalyst 1 is first coiled with a relatively small coiling diameter and relatively small coil pitches, and then the resultant small-diameter coil is further coiled with a relatively large coiling diameter and relatively large coil pitches.

The double-coil-shaped wire catalyst 1A is disposed in the vessel (piping) 8 such that the axis of the second coiling extends along the axis of the vessel 8.

In the latter double coiled case, the amount of the supported catalytic material X per unit volume can be further increased, and thereby it becomes possible to further improve the reaction response.

In these embodiments, it is preferable that the inner surface of the vessel 8 is also provided with the alumina surface layer 3a on which the catalytic material X is supported similarly to the wire catalyst 1.

As shown in FIG. 7 for example, in the case that a plurality of coil-shaped wire catalysts 1A are disposed in line within one vessel (piping) 8 through which the fluid to be processed flows, it is possible to independently control the heat generation of each coil-shaped wire catalyst 1A by change the supplied power.

FIG. 7 shows as if the coil-shaped wire catalysts 1A are supplied with power from different power sources VA1 and VA2 respectively, but it is of course not always necessary. It is possible to supply power from one power source but through different power controllers.

In any case, by independently controlling the heat generation, there is a possibility that the performance of the system as a whole can be improved.

More specifically, since the fluid draws heat from the coil-shaped wire catalyst 1A located upstream more than the coil-shaped wire catalyst 1A located downstream, by increasing the supplied power on the upstream side, it is possible to even the temperature distribution.

This is one of the advantageous features of the wire catalyst of the self-heating type.

Incidentally, if needed, in order to prevent the fluid from leaking through openings for wirings provided on the vessel, the gap is closed by a heat-resistant infill.

As further embodiments of the shaped wire catalyst 1A, a plurality of the wire catalysts 1 can be assembled into a screen mesh having a mesh size of about 100 to 300 # for example, or shaped into a form like aggregation such as felt or cotton ball as explained above.

In such embodiments, each of the wire catalysts 1 can be provided with the above-mentioned connecting portions 4, but it is also possible to provide the connecting portions 4 on subset of the wire catalysts. In this case, the rest can be heated by the radiated heat from the wire catalyst(s) self-heated.

Figure 9:
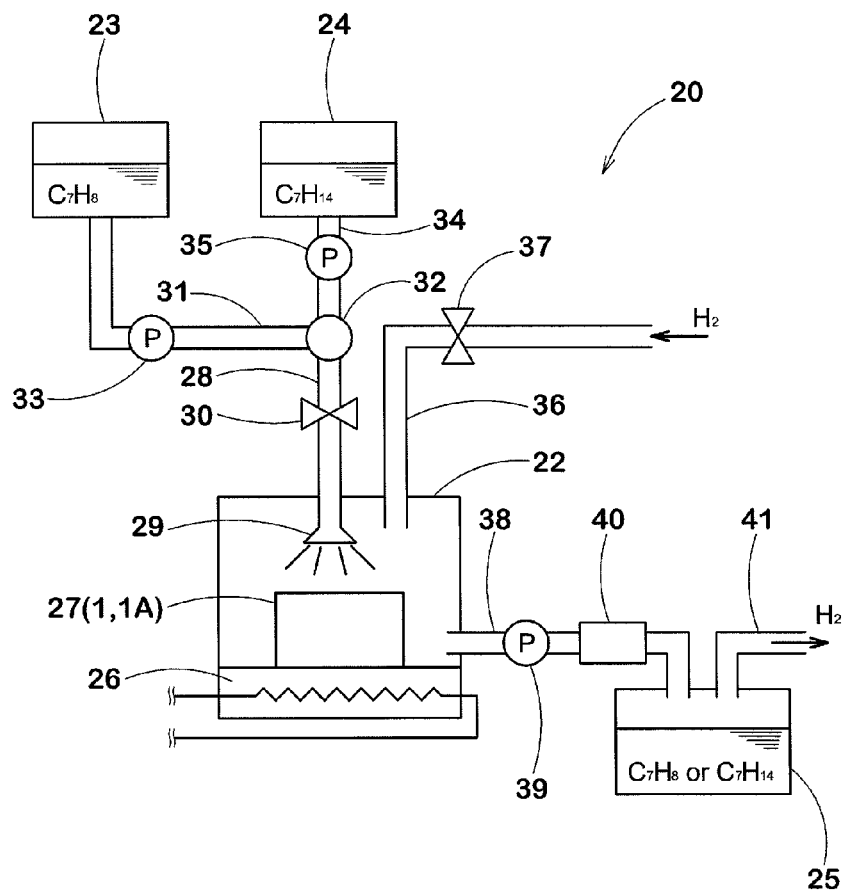
FIG. 9 is a diagram showing a hydrogen storing/producing system including the wire catalysts according to the present invention.

In order to achieve hydrogenation/dehydrogenation reactions by the use of the wire catalyst 1 or shaped wire catalyst 1A constructed as above, a hydrogen storing/producing system 20 as shown in FIG. 9 for example may be used, wherein the wire catalyst 1 or shaped wire catalyst 1A is disposed in a demarcated vessel as shown in FIG. 7 or FIG. 8.

This hydrogen storing/producing system 20 can add hydrogen to an aromatic compound (for example, toluene) to produce the hydrogenated derivative or organic hydride (for example, methylcyclohexane) and can store hydrogen in the form of the organic hydride. Further, this system can dehydrogenate the organic hydride to thereby produce hydrogen and the aromatic compound.

The hydrogen storing/producing system 20 essentially comprises a reactor 22, a first tank 23 for storing the aromatic compound, a second tank 24 for storing the organic hydride, a third tank 25 for storing the reaction product produced by the reactor 22.

The above-mentioned reactor 22 comprises at least one shaped wire catalyst 1A formed from the wire catalyst 1 which is provided with the above-mentioned platinum catalyst for hydrogenation/dehydrogenation reactions and which is heated by the heating means utilizing an electric current directly passing therethrough or electromagnetic induction.

In this embodiment, a plurality of the shaped wire catalysts 1A as shown in FIG. 7 are disposed within a vessel having an internal flow path through which the fluid to be processed flows.

The shaped wire catalysts 1A are each connected to an external power supply 6, and forms a self-heatable module 27.

Therefore, the reaction efficiency is increased, and easy handling is possible.

Although this module 27 is self-heatable, if necessary, it is possible to use it together with an external heater 26 in order to preheat the vessel.

On the upper side of the reactor 22, a first piping 28 for supplying the liquid to be processed penetrates into the inside of the reactor 22 so that the end is positioned inside the reactor 22, and the end is provided with a spray nozzle 29.

On the outside of the reactor 22, the first piping 28 is provided with a valve 30.

Further, the other end of the first piping 28 which end is opposite to the spray nozzle 29, is provided with a three-way valve 32.

The first tank 23 is connected to a port of the three-way valve 32 through a piping 31 provided on its way with a conveying pump 33.

The second tank 24 is connected to another port of the three-way valve 32 through a piping 34 provided on its way with a conveying pump 35.

The three-way valve 32 can select one of the three positions:

a) to open only the path between the first tank 23 and reactor 22, b) to open only the path between the second tank 24 and reactor 22, and c) to close both of the path between the first tank 23 and reactor 22 and the path between the second tank 24 and reactor 22.

On the upper side of the reactor 22, a second piping 36 for supplying hydrogen penetrates into the inside of the reactor 22 so that the end is opened in the reactor 22.

This second piping 36 is provided on its way with a valve 37.

On the outside of the reactor 22, the other end of the second piping 36 is connected to a hydrogen supply source (not shown).

A lower part of the inside of the reactor 22 near the bottom is connected to an upper part of the inside of the third tank 25 through a third piping 38 provided on its way with a pump 39 and a cooler 40.

Further, a piping 41 for exhausting gases such as hydrogen is connected to the upper side of the third tank 25.

In the system 20 constructed as above, the procedure for storing hydrogen in the form of the organic hydride is as follows.

First, the wire catalysts 1 as the shaped wire catalysts are heated up to a specific temperature.

Then, the valve 37 is opened, and through the second piping 36, hydrogen is supplied into the reactor 22.

At this time, it is preferable to flow hydrogen outside the reactor 22 through the piping 41 by operating the pump 39.

Next, the three-way valve 32 is selected to open only the path between the first tank 23 and reactor 22, and the conveying pump 33 is operated to supply the aromatic compound stored in the first tank 23 toward the reactor 22. And by opening the valve 30 at constant time intervals for example, the aromatic compound is sprayed into the reactor 22 by the spray nozzle 29 at the constant time intervals. In the inside of the reactor 22, the hydrogenation reaction of the sprayed aromatic compound and hydrogen occurs on the wire catalysts 1, and the organic hydride is produced.

The produced organic hydride is conveyed to the third tank 25 by operating the pump 39.

The product in the form of gas passing through the third piping 38 is cooled by the cooler 40 and stored in the third tank 25 in the form of liquid.

The hydrogen not condensed by the cooler 40 is ejected to the outside through the piping 41.

On the other hand, the procedure for producing hydrogen by the dehydrogenation reaction of the organic hydride is as follows.

First, the wire catalysts 1 are heated.

Then, the pump 39 is operated, and the three-way valve 32 is selected to open only the path between the second tank 24 and reactor 22.

Further, by operating the conveying pump 35, the organic hydride in the second tank 24 is supplied toward the reactor 22.

And by opening the valve 30 at constant time intervals, the organic hydride is sprayed into the reactor 22 by the spray nozzle 29 at the constant time intervals.

Thus, the sprayed organic hydride contacts with the wire catalysts 1, and dehydrogenation reaction is caused.

Thereby, hydrogen and the aromatic compound are produced. By operating the pump 39, the aromatic compound in the form of gas is conveyed toward the third tank 25, and the aromatic compound passing though the third piping 38 is cooled by the cooler 40 and stored in the third tank 25 in the form of liquid.

The hydrogen not condensed by the cooler 40 is ejected to the outside through the piping 41.

As explained above, the wire catalyst 1 in this embodiment can be used for both of the hydrogenation reaction and dehydrogenation reaction. But, it is of course possible to use it for hydrogenation reaction only or dehydrogenation reaction only.

Figure 11:
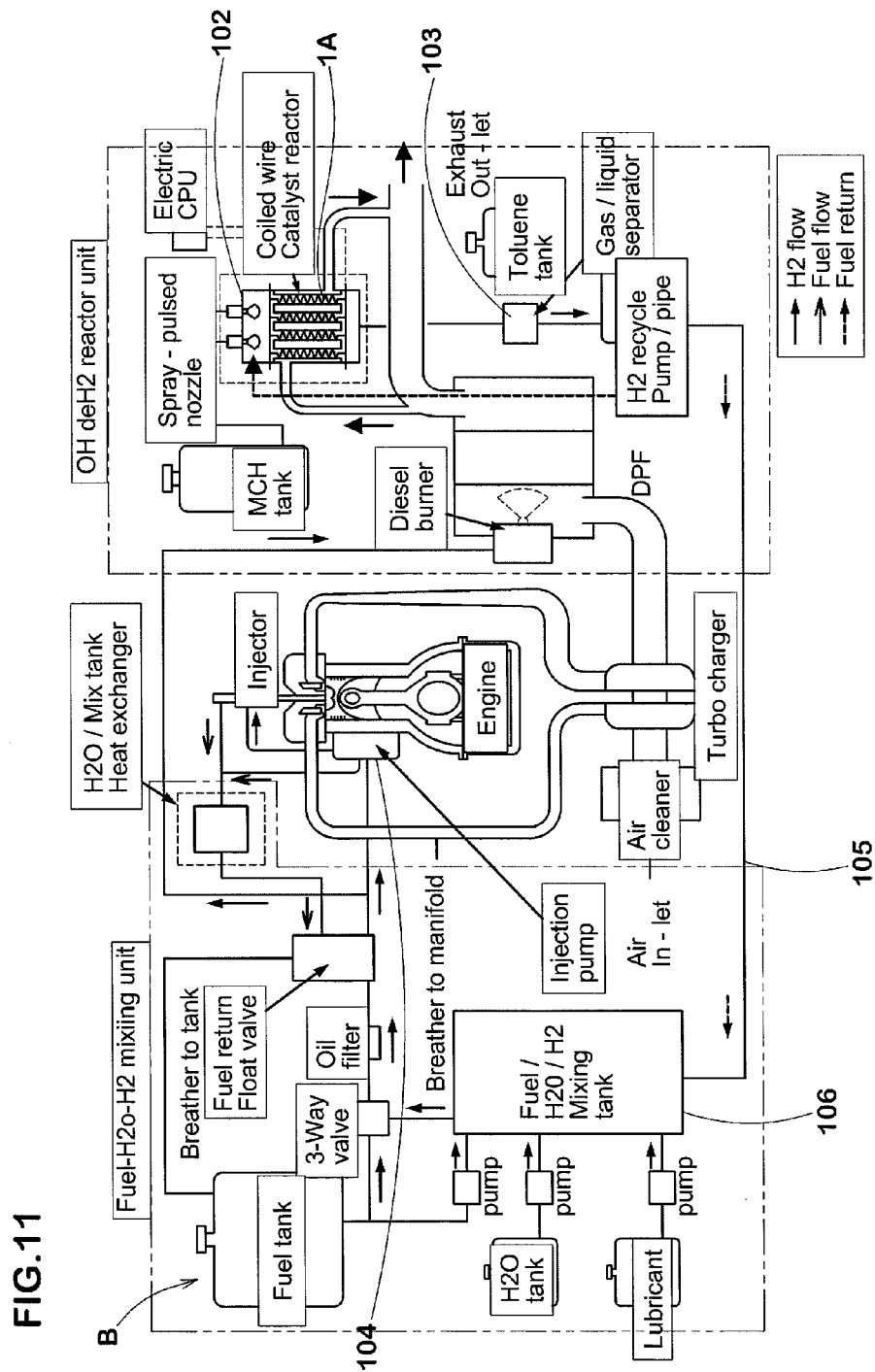
FIG. 11 shows a combustion system for an internal-combustion engine according to the present invention which can be used in a diesel locomotive for example.

FIG. 11 shown a combustion system B for an internal-combustion engine comprising a catalyst module 102 (hydrogen producing means). This system can be employed in a diesel locomotive for example.

The catalyst module 102 is assembled from a wire catalyst or shaped wire catalyst 1A according to the present invention disposed in the piping 8 as shown in FIG. 7 or 8.

In this construction, the catalyst module 102 includes a plurality of shaped wire catalysts 1A isolated from the outward, wherein the shaped wire catalysts are supported between two platy support members having through holes so that the shaped wire catalysts positioned at the respective through holes.

The fluid to be processed (material of hydrogen) is flowed from one of the platy support members to the other while contacting the catalytic material and hydrogen is produced. Then the product materials are separated by a gas/liquid separator 103.

The catalyst module 102 is heated by means of self heating (namely, Joule heating by an electric current supplied from an external power supply and passing through the wire catalysts) and
indirect heating (namely, the surrounding area of the module is heated by the heat of the exhaust gas produced by the engine 104).

In the case of such indirect heating, as shown in FIG. 7 or 8, by using the piping 8 or the like, the shaped wire catalysts 1A disposed therein and the produced hydrogen therein should be completely isolated from the exhaust gas.

The hydrogen production using the catalyst module 102 is achieved by dehydrogenation reaction of the material of hydrogen.

The material of hydrogen is an organic hydride (OH) of an aromatic compound which is the above-mentioned hydrogenated derivative.

As the material of hydrogen, cyclohexane, decalin, methylcyclohexane, methyldecalin, bicyclohexyl and the like can be used.

In particular, methylcyclohexane is preferably used because of the following reasons.

Methylcyclohexane is in the form of liquid at low temperatures and thus superior in the storage and safety. Further, the hydrogen content of the molecule is high, and the reaction activity in the dehydrogenation reaction when platinum is used as catalyst is also high, therefore, more effective production of hydrogen is possible.

The supply of the material of hydrogen to the catalyst is made by spraying similarly to FIG. 9, therefore, decrease in the temperature of the shaped wire catalysts 1A can be prevented and more stable catalytic reaction can be obtained.

The method for supplying the material of hydrogen, the conditions for the supplying, the specifications of the catalyst module 102 such as arrangement, volume and the like can be determined arbitrarily according to the intended purpose or use, the installation space, the amount of hydrogen to be produced, and the like.

Therefore, the present invention is not limited to the above-described embodiment.

Further, additional equipments required for this system can be chosen arbitrarily according to the needs, and the system illustrated in FIG. 11 will be well understand by a person skilled in the art from short descriptions presented in the figure.

The produced hydrogen is conveyed through a piping 105 to a mixing tank 106 in which the hydrogen is mixed with the main fuel, e.g. gasoline, diesel oil or the like at a specific mixing ratio, and then the mixed fuel is supplied to the engine 104.

According to an engine test conducted by the present inventers, when an internal-combustion engine was operated using nano-mixed fuel prepared from hydrogen, $H_2O$ and light oil and having mixture fractions such that the hydrogen/light oil ratio is 1 to 10%, and the $H_2O$/light oil ratio is 3 to 5%, under the condition that the volume ratio of air to the hydrocarbon fuel is in the range of from 15 to 25,
the fuel consumption was reduced by 10 to 30%, and $CO_2$, NOx(nitrogen oxide) and carbon particles in the exhaust gas were decreased by 10 to 30%, 15 to 35% and 35 to 50%, respectively in comparison with the case where hydrogen was not used.

Therefore, in the internal-combustion engine system using the above-mentioned wire catalyst/shaped wire catalyst according to the present invention,
the combustion efficiency can be greatly improved,
the operation at high air-fuel ratios is possible, and
the emissions of carbon dioxide, nitrogen oxide and carbon particles can be reduced.

Therefore, the internal-combustion engine system can be applied to transportations which are difficult to be electrified, for example, ships, diesel locomotives and the like.

EXAMPLES

Concrete examples of the wire catalyst for hydrogenation/dehydrogenation reactions according to the present invention and the method for manufacturing the wire catalyst will be described hereinafter. The present invention is however not limited thereto.

Test Example 1

Manufacturing of Aluminum Clad Metallic Core

A nickelic wire (nickel 99%, electric resistance 9.5 micro ohm/cm @20 degrees C.) and a stainless steel wire (SUS304, nickel 8%, chrome 18%, electric resistance 72 micro ohm/cm @20 degrees C.) were each cladded with aluminum (purity 99.9%), and
two kinds of composite wires having a diameter of 4 mm were prepared as the base materials.

These base materials were each subjected to multiple-stage cold-wire-drawing associated with intermediate heat treatment (for example, at 600 degrees C. in the case of nickelic wire) in order to make the following two kinds of thin clad wires A and B.

Clad wire A having a wire diameter of 0.7 mm and composed of the nickelic core wire covered with an aluminum surface layer having a thickness of 30 to 60 micrometers Clad wire B having a wire diameter of 0.45 mm and composed of the stainless core wire covered with an aluminum surface layer having a thickness of 20 micrometers FIG. 3 is a microscope photograph (×160) showing a cross section of the clad wire A.

[Coiling of Clad Wire and Alumite Treatment]

By coiling the clad wires A and B, the coil-shaped wire catalysts A and B having a length of 12 cm in the coil's axial direction, an average coil diameter D of 6 mm and coil pitches P of 0.1 mm were formed.

In the coil-shaped wire catalyst A, the ratio of the average coil diameter D to the wire diameter d of the clad wire was 8.6.

And in the coil-shaped wire catalyst B, the ratio was 13.3.

With respect to the volume surrounded by the coiled part, the apparent surface area of the above-mentioned wire catalyst per unit volume could be increased to 1.40-1.46 sq.mm/cu.mm.

Thus, the area for supporting the catalytic material could be increased.

Using an AC/DC power source supply, the coil-shaped wire catalysts A and B (without making heating treatment) where subjected to an anodizing treatment, while watching the voltage waveform, until the electrolysis voltage abruptly decreased.

In each of the shaped wire catalysts, the anodizing treatment was made on the coiled part excepting both end portions so as to form the above-mentioned connecting portions by the end portions substantially not covered with the alumina layer.

The anodizing conditions were as follows.
aqueous solution of 4 wt % oxalic acid
temperature 35 degrees C.
current density 60 A/sq.m After the end of the anodizing treatment, the products A and B were further subjected to an acidic treatment by dipping them into the oxalic acid treatment liquid of the same kind for six hours, and then they were dried in the atmosphere.

Then, an calcination treatment was made at a temperature of 350 degrees C. for one hour,
thereafter a hydration treatment was made at a temperature of lower than 80 degrees C. for about two hours.

Furthermore, after dried, a calcination treatment was made at a temperature of 500 degrees C. for three hours.

Thereby, the alumite clad metallic cores provided with an alumina layer of a heat-stable porous structure having a thickness of 10-30 micrometers were prepared as shown in FIG. 4.

FIG. 4 shows a part of the cross section of the alumite clad nickelic core having the porous alumina layer of 20 micrometer thickness, wherein the formed microscopic pores had an average pore diameter of 30 nm and aspect ratio of 700 (namely deep pores).

[Method of Preparing Catalyst]

Chloro-platinum acid $H_2PtCl_6 6H_2O$ (0.01 gr, 0.015 gr and 0.02 gr) as a platinum salt finally becoming the catalytic material was dissolved by 10 cc of ethanol to make three kinds of chloro-platinum acid solutions.

The products A and B (alumite clad nickel core A and alumite clad stainless core B) provided with the porous alumina surface layers of 10, 20 and 30 micrometer thickness were dipped into the solutions.

Then, while the products A and B were placed in hydrogenous atmosphere (hydrogen/nitrogen=0.25, gas flow rate=100 cc/min), the temperature was
increased from 25 to 150 degrees C. per one hour,
then kept at 150 degrees C. for one hour,
then increased from 150 to 400 degrees C. per two hours,
then kept at 400 degrees C. for one hour, and
then decreased to 25 degrees C.,
thereby wire catalysts A-1, A-2, A-3 and B-1 were made.

Each of these platinum support alumite clad wire (ACW) catalysts was connected to the external power supply, and set in nitrogen atmosphere, and heated up to specific temperatures uniformly over the entire length by means of an external heat source or an electric current directly passing therethrough, and tested for an hydrogenation reaction of an aromatic hydrocarbon and a dehydrogenation reaction of the hydrogenated derivative (organic hydride) thereof.

<Ref.1>

Using a solution of 4 wt % oxalic acid as the electrolyte solution in the atmosphere (@ 20 degrees C.), an aluminum plate of 40 mm×40 mm×5 mm was anodized for seven hours at an electric current density of 0.5 A/sq.dm, and thereby the anodized coating layer of 50 micrometer thickness was formed.

Then, the plate was dipped into the solution of 4 wt % oxalic acid whose temperature was kept at 20 degrees C. for five minutes.

Thereafter, the acid solution was rinsed off, and
the plate was subjected to a heat treatment at 350 degrees C. for three hours in the air atmosphere, and thereby the aluminum plate having a porous aluminum surface layer was made.

Then, an aqueous solution of chloro-platinum acid $H_2PtCl_6$ containing platinum 18 mg was sprayed onto the surface of the porous aluminum, and
the plate was subjected to burning at 350 to 500 degrees C. for three hours.

Thereafter, placing the plate in the hydrogenous atmosphere of 10% hydrogen attenuated by nitrogen, the temperature was gradually increased from room temperature to 350 degrees C., and a 0.5 wt % platinum support alumite plate catalyst (C) (3 gr Pt/sq.m) was prepared.

<Ref.2>

Using active carbon, silica and alumina, for the purpose of comparison, 0.5 wt % platinum support catalysts were prepared by: dipping into an aqueous solution of chloro-platinum acid $H_2PtCl_6$; then drying; and increasing the temperature gradually from 100 to 350 degrees C. per three hours in the hydrogenous atmosphere; and hydrogen reduction in the same hydrogenous atmosphere.

Test Example-2

Dehydrogenation reaction of methylcyclohexane was made by the use of each of the following catalysts in the system shown in FIG. 9:
the 0.5 wt % platinum support alumite clad nickel wire catalysts (A-1) and (A-3);
the 0.5 wt % platinum support alumite clad stainless wire catalyst (B-1);
the 0.5 wt % platinum support alumite plate catalyst (C);
the 0.5 wt % platinum support active carbon (D); and
the 0.5 wt % platinum support alumina pellet catalyst (E).

And the hydrogen generating rate and the toluene selectivity of the additive rate of methylcyclohexane were determined by the use of a gas chromatographic.

In the test, each test catalyst was heated to 310 degrees C. and placed in a nitrogen flow. And into the nitrogen flow, methylcyclohexane was sprayed at a rate of 150 ml/min by the use of the pulse-type spray nozzle provided in the system.

The duration time of one spraying was 0.5 second.

The amount of methylcyclohexane sprayed one time was 0.39 gr.

The intervals of spraying was 10 or 20 seconds.

The temperature of the surface of the wire catalyst was measured with a radiation thermometer.

The heating of the test catalysts was made by the external heater 26 and an electric current passing through the wire catalyst and supplied from a current-voltage stabilizing power supply provided outside the system.

The dehydrogenation reaction activity for methylcyclohexane, the methylcyclohexane conversion ratio and the selectivity measured are shown in Table 1.

the 0.5 wt % platinum-rhenium support alumite clad wire catalyst (A-4), the 0.5 wt % platinum-molybdenum support alumite clad wire catalyst (A-5), the 0.5 wt % platinum-tungsten support alumite clad wire catalyst (A-6), the 0.5 wt % platinum-nickel-titanium support alumite clad wire catalyst (A-7), the 0.5 wt % platinum-rhodium-zirconium-zinc support alumite clad wire catalyst (A-8), the 0.5 wt % platinum support alumite plate catalyst (C), the 0.5 wt % platinum support active carbon (D), the 0.5 wt % platinum support alumina pellet catalyst (E).

TABLE 1

| | catalyst | hydrogen generating rate/activity | | methylcyclohexane | toluene |
|---|---|---|---|---|---|
| | | mL/min/gr | mL/min/gr Pt | conversion ratio (%) | selectivity (%) |
| Embodiment 1 | 0.5% Pt/ACW (A-1) | 25 | 47300 | 23 | 99 |
| Embodiment 2 | 0.5% Pt/ACW (A-3) | 38 | 72000 | 35 | 98 |
| Embodiment 3 | 0.5% Pt/ACW (B-1) | 22 | 41130 | 20 | 85 |
| Ref. 1 | 0.5% Pt/alumite plate (C) | 13 | 24670 | 12 | 90 |
| Ref. 2 | 0.5% Pt/active carbon (D) | 4.9 | 9250 | 4.5 | 92 |
| Ref. 3 | 0.5% Pt/Al$_2$O$_3$ (E) | 2.7 | 5140 | 2.5 | 87 |

In the outlet gas, a tiny amount of methane was detected as a product other than hydrogen as a result of a gas chromatography analysis.

Using the platinum support alumite clad wire catalyst (A-3) in the hydrogenous atmosphere, the dehydrogenation reaction was made continuously for ten hours at 300 degrees C. by spraying methylcyclohexane (duration time of one spraying: 1 second, intervals of spraying: 10 seconds), and the temporal change in the hydrogen generating rate was measured.

As a result, it was found that the hydrogen generating rate was stable and not decreased for five hours.

Test Example-3

Similarly to the above-mentioned hydrogenation reaction, using the system shown in FIG. 9 under similar reaction conditions, dehydrogenation reaction of cyclohexane was made with respect to the following catalysts:
the 0.5 wt % platinum support alumite clad wire catalyst (A-2), And the hydrogen generating rate at 320 degrees C. and the cyclohexane conversion ratio were determined based on a gas chromatography analysis.

The benzene selectivity, the cyclohexane conversion ratio and the hydrogen generating rate per 1 gr of the catalyst or Pt are shown in Table 2.

In the platinum support alumite clad wire catalyst, the amount of Pt supported was 2 gr/sq.m.

With respect to the added transition metals M, M/Pt=0.2 atom ratio (wherein M=Re, Rh, Mo, W, Ni, Ti, Zr and Zn)

TABLE 2

| | catalyst | hydrogen generating rate/activity | | cyclohexane | benzene |
|---|---|---|---|---|---|
| | | mL/min/gr cat | mL/min/gr Pt | conversion ratio (%) | selectivity (%) |
| Embodiment 4 | 0.5% Pt/ACW (A-2) | 68 | 142000 | 65 | 100 |
| Embodiment 5 | 0.5% Pt—Re/ACW (A-4) | 85 | 178150 | 87 | 99 |
| Embodiment 6 | 0.5% Pt—Mo/ACW (A-5) | 75 | 156100 | 75 | 99 |
| Embodiment 7 | 0.5% Pt—W/ACW (A-6) | 98 | 203200 | 98 | 99 |
| Embodiment 8 | 0.5% Pt—Ni—Ti/ACW (A-7) | 86 | 176000 | 85 | 98 |
| Embodiment 9 | 0.5% Pt—RhZrZn/ACW (A-8) | 74 | 153500 | 72 | 96 |
| Ref. 4 | 0.5% Pt/alumite plate (C) | 38 | 78750 | 36 | 98 |
| Ref. 5 | 0.5% Pt/active carbon (D) | 6.8 | 16500 | 8.3 | 95 |
| Ref. 6 | 0.5% Pt/Al$_2$O$_3$ (E) | 3.2 | 7600 | 3.7 | 91 |

In the Embodiments, the cyclohexane(methylcyclohexane) conversion ratio, benzene (toluene) selectivity, and hydrogen generating rate are defined as follows.

Cyclohexane(methylcyclohexane)conversion ratio (%)=(number of moles of produced benzene (toluene)/number of moles of cyclohexane(methylcyclohexane))×100

Benzene selectivity(%)=(number of moles of produced benzene(toluene)/number of moles of produced cyclohexane(methylcyclohexane))×100

Hydrogen generating rate (mL/min/gr cat)=volume of hydrogen produced by the catalyst of 1 gr per minute Hydrogen generating activity (mL/min/gr Pt)=volume of hydrogen produced by platinum of 1 gr per minute <Evaluations of Embodiments 1-5>

Table 1 shows the dehydrogenation reaction activity when the dehydrogenation reaction of methylcyclohexane was made in the nitrogen atmosphere using:
the platinum support alumite clad wire catalysts (A-1), (A-3) and (B-1) relating to Embodiments 1-3,
the platinum support alumite plate catalyst (Ref.1),
the platinum support active carbon catalyst in the form of fabric (Ref.2), and
the 0.5 wt % platinum support alumina catalyst (Ref.3).

In the table, the code "ACW" means alumite (alumina) clad wire.

The platinum support alumite clad wire catalysts as Embodiments 1-3 showed hydrogen generating rates and methylcyclohexane conversion ratios being 2 to 3 times higher than those of Ref.1, and being 8 to 10 times higher than those of Refs. 2 and 3.

Therefore, the catalyst support alumite clad wire catalysts according to the present invention are efficient in the dehydrogenation reaction of methylhexane, and shows a quick response to the demand of hydrogen.

Such tendency can be also seen in other catalytic materials shown in Table 2 which shows
the hydrogen generating rate, the dehydrogenation reaction activity and the selectivity when the dehydrogenation reaction of cyclohexane was made at 320 degrees C. using the platinum support alumite clad wire catalyst (A-2),
the platinum-rhenium support alumite clad wire catalyst (A-4),
the platinum-molybdenum support alumite clad wire catalyst (A-5),
the platinum-tungsten support alumite clad wire catalyst (A-6),
the platinum-nickel-titanium support alumite clad wire catalyst (A-7),
the platinum-rhodium-zirconium-zinc support alumite clad wire catalyst (A-8),
the platinum support alumite plate catalyst (C),
the platinum support active carbon catalyst (D) in the form of fabric, and
the platinum support alumina pellet catalyst (E).

Embodiments 4 to 9 (alumite clad wire catalysts provided with platinum and platinum-transition metals) showed the activity of the dehydrogenation reaction of cyclohexane being 2.5 to 15 times higher than Refs. 4 to 6 (platinum support alumite catalyst, fabric-shaped active carbon catalyst, alumina catalyst).

And it was confirmed that Embodiments 4 to 9 were improved in the hydrogen generating rate and selectivity.

Further, it was also confirmed that the activity can be further improved by adding to platinum one or more transition metals such as rhenium, molybdenum, tungsten, nickel, rhodium, zirconium and zinc.

Thus, demonstrated the usability of the alumite clad wire catalyst provided with supported platinum and transition metal(s) when used in the internal-combustion engines, fuel-cell-systems utilizing organic hydride and the like which require a good hydrogen supply rate and response when supplying hydrogen thereto.

Using the system shown in FIG. 9, the hydrogenation reaction activity of toluene was measured, wherein the hydrogenation reaction of toluene was made using the 0.5 wt % platinum support alumite clad nickel wire catalyst (A-3),
the platinum-nickel support alumite clad stainless wire catalyst (B-2),
the 0.5 wt % active carbon catalyst (c), and
the platinum support alumina pellet catalyst (E) under the following reaction conditions.

Temperature of setting: 260 degrees C.

Reaction pressure: 1 atmosphere

Toluene supplying rate: 0.3 ml/sec

Hydrogen supplying rate: 100 ml/min

And the toluene conversion ratio was determined based on a gas chromatography analysis. The analyses of the reaction products were made based on gas chromatography using TCD and FID types of detectors.

Table 3 shows the methylcyclohexane conversion ratio and the hydrogenation reaction activity in the hydrogenation reaction of toluene.

TABLE 3

| | catalyst | hydrogenation reaction rate/activity | | methylcyclohexane |
|---|---|---|---|---|
| | | mmol/min/gr cat | mmol/min/g Pt | conversion ratio (%) |
| Embodiment 10 | 0.5% Pt/ACW (A-3) | 0.58 | 110 | 12 |
| Embodiment 11 | 0.5% Pt—Ni/ACW (B-2) | 0.78 | 146 | 16 |
| Ref. 7 | 0.5% Pt/active carbon (D) | 0.18 | 35 | 3.8 |
| Ref. 8 | 0.5% Pt/Al$_2$O$_3$ (E) | 0.13 | 26 | 2.8 |

In Table 3, the platinum support alumite clad nickel wire catalyst (A-3) and platinum-nickel support alumite clad stainless wire catalyst (B-2) as Embodiments 10 and 11, respectively, showed that, in the hydrogenation reaction of toluene, the conversion ratio to methylcyclohexanone per the catalyst of 1 gr is 3 to 5 times higher than Refs. 7 and 8.

Thus, demonstrated the usability of the alumite clad wire catalyst provided with supported platinum and transition metal(s) when used in the internal-combustion engines, fuel-cell-systems utilizing an organic hydride such as methylhexane and the like which require a good hydrogen storage rate and response in a hydrogen supplying system.

Test Example-4

The shaped wire catalysts according to the present invention were tested for the heat generation property and the durability of the alumite surface layer against heat stress.

In the test, metallic cores whose diameter d was decreased to 0.45 mm by further wire drawing, were prepared based on the above-mentioned clad wire A, and the metallic cores were coiled to have average coil diameters D of 6.0 mm, 4.0 mm and 2.0 mm.

Thus, three kinds of coil-shaped wire catalysts having different ratios D/d were prepared.

And the alumina layer was formed and the catalyst was supported thereon as explained above.

The coiling operation was carried out by the use of a usual coiling machine. The coil length was 120 mm. The coiling pitch was 1.02 times d, accordingly, the ratios D/d were 4.4 to 13.3.

Both end portions were formed as the connecting portions for wirings without alumina coating layer.

Figure 10:
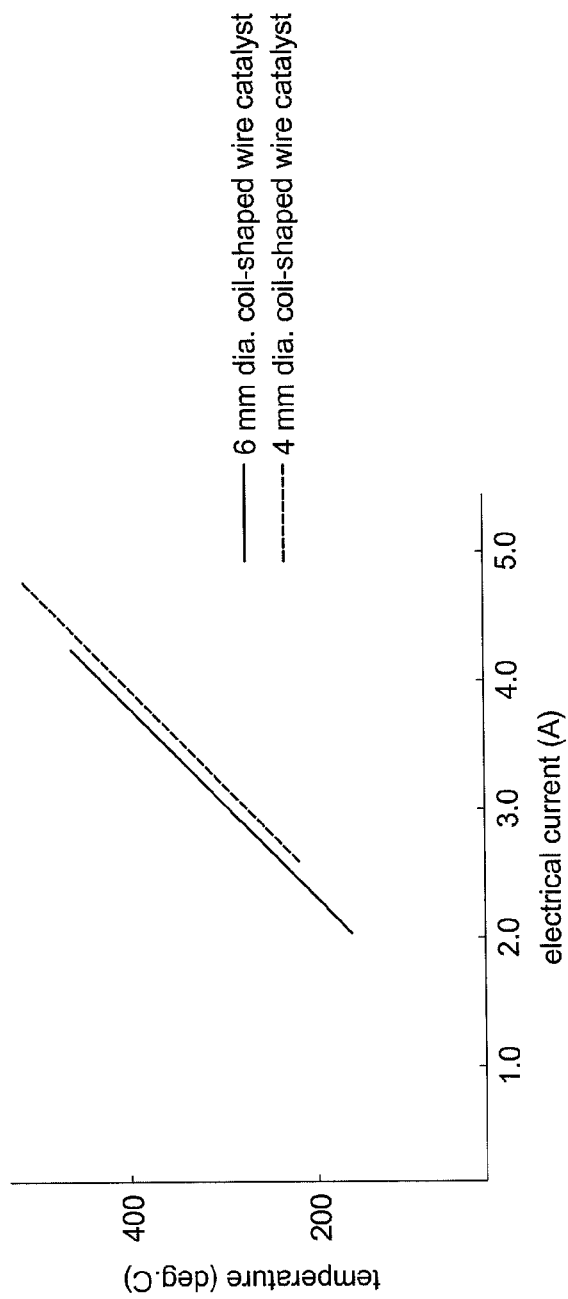
FIG. 10 is a graph showing the temperature of wire catalysts as a function of the value of the electrical current passing therethrough.

With respect to the coil-shaped wire catalysts having the coil diameters of 6 mm and 4 mm, their temperature in deg. C are shown in FIG. 10 as a function of the value of the electrical current passing therethrough. As shown, the temperature and the electrical current value have a linear relation, and for example, 350 degrees C. can be achieved by 3.5 A.

With respect to each of the three shaped wire catalysts, heat stress was applied by repeating the heating to 350 degrees C. by passing the electric current and the cooling by stopping the electric current (one cycle=60 seconds), while checking the alumina surface layer.

As a result, in the case of the coil-shaped wire catalyst having the average coil diameter D of 2.0 mm, microcracks were found on the alumina surface layer after 20 cycles. But, in the case of two other catalysts, microcracks were not found even after 100 cycles or more. Further, no deformation was found with respect to the coil shape. Therefore, it was confirmed that, in order to prolong the operating life, it is effective to increase the ratio D/d.

The invention claimed is:

1. A method for manufacturing a shaped wire catalyst for hydrogenation reaction and/or dehydrogenation reaction comprising the steps of:
   preparing a metallic core in the form of a wire capable of generating heat by passing an electric current therethrough or electromagnetic induction;
   shaping the metallic core into a predetermined specific shape; then
   applying a surface treatment to the shaped metallic core so that, through an oxidizing reaction, the shaped metallic core is at least partially provided with an oxide surface layer having a porous structure having a large number of pores; and
   providing a catalytic material supported in the pores.

2. The method according to claim 1, wherein
   the metallic core is a composite wire comprising a metallic central core portion having an electrical resistivity of not less than 5 micro ohm/cm at ordinary temperatures, and an aluminum layer covering the surface of the metallic central core portion, and
   the method further comprises a step of drawing the composite wire to decrease the diameter so that the total surface reduction rate becomes not less than 80%.

3. The method according to claim 2, wherein
   in the step of shaping the metallic core, the composite wire of which diameter is decreased is coiled.

4. The method according to claim 1, which further comprises a step of applying, after forming the oxide surface layer having the pores, a pore enlarging treatment to increase the opening area and depth of the pores and/or a calcination treatment.

5. The method according to claim 1, wherein
   the step of providing the supported catalytic material includes
   a treatment for making the catalytic material being supported in the pores of the oxide surface layer by impregnation or vapor-phase deposition, and
   a treatment for calcining and/or reducing the metallic core with the supported catalytic material.

6. The method according to claim 2, which further comprises a step of applying, after forming the oxide surface layer having the pores, a pore enlarging treatment to increase the opening area and depth of the pores and/or a calcination treatment.

7. The method according to claim 3, which further comprises a step of applying, after forming the oxide surface layer having the pores, a pore enlarging treatment to increase the opening area and depth of the pores and/or a calcination treatment.

* * * * *